May 26, 1953     C. W. CONRAD     2,639,882
VALVE
Filed July 1, 1948
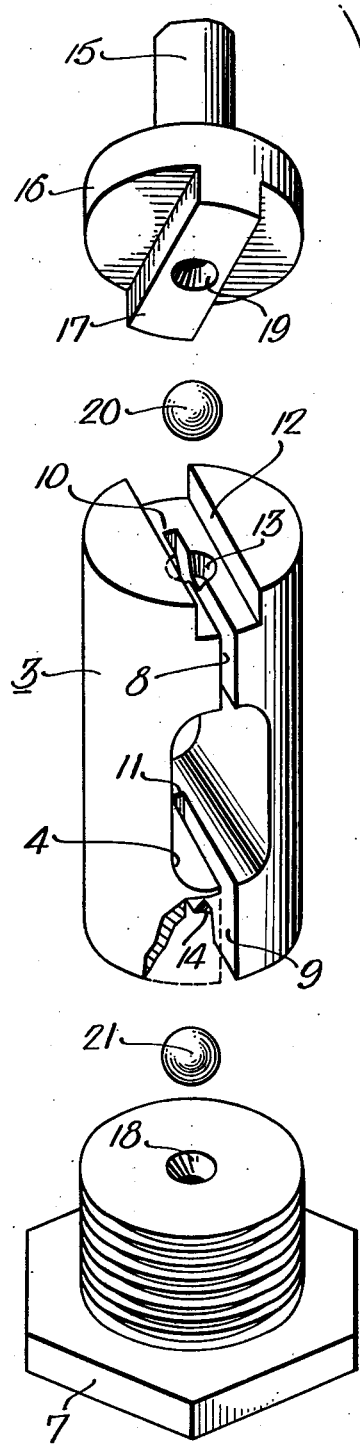
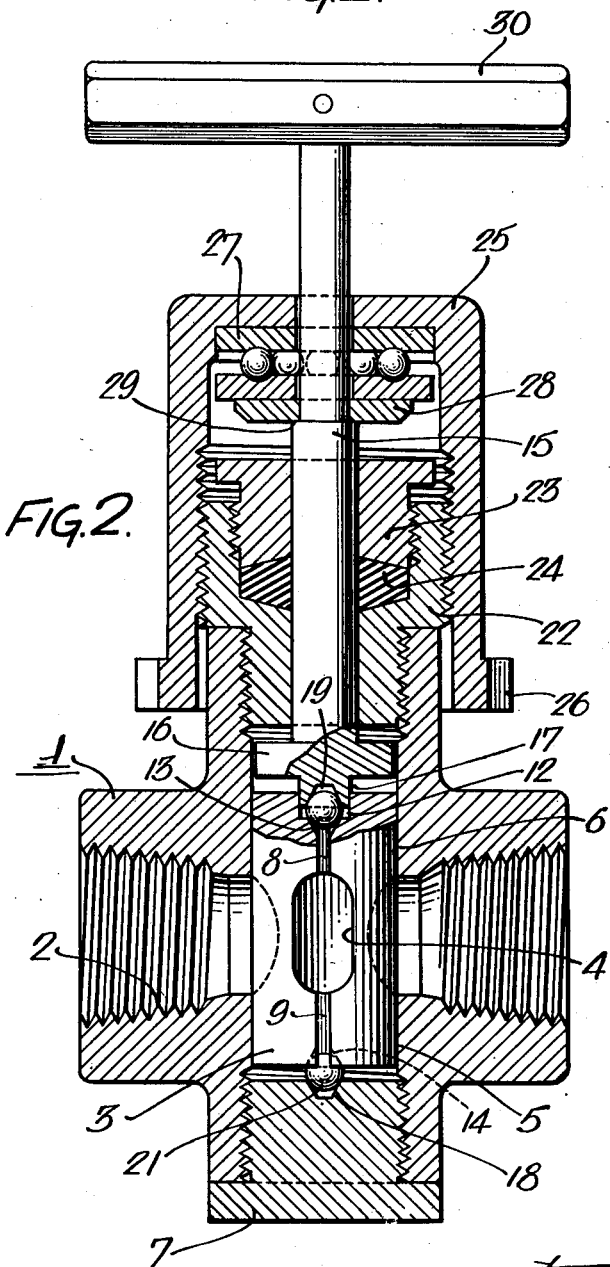
Inventor:
Charles W. Conrad
by his Attorneys
Howson & Howson Patented May 26, 1953

2,639,882

UNITED STATES PATENT OFFICE 2,639,882

VALVE

Charles W. Conrad, Philadelphia, Pa.

Application July 1, 1948, Serial No. 36,402

5 Claims. (Cl. 251—102)

This invention relates to mechanical valves and more particularly to valves of the type which operate solely by rotation of a valve member to open and close a passage. Such a valve is simple and inexpensive but is subject to the objection that it tends to develop leakage more rapidly than does a valve which operates on the seating principle. This is due to the fact that there is nothing to compensate for wear of the parts in a simple rotary type valve. Such leakage tendency is particularly pronounced where the valve is used to control flow of liquids of extremely low viscosity.

The principal object of the present invention is to provide a simple rotary type valve embodying means operable at will to compensate for wear of the parts and to prevent leakage throughout the useful life of the valve.

Another object of the invention is to provide a valve of the stated character which is simple in construction and may be manufactured at low cost.

A further object of the invention is to provide a valve which may be easily assembled and disassembled both during manufacture and for replacement of parts.

Still another object of the invention is to provide a rotary valve having an expansible valve member which may be expanded at will to compensate for wear of the parts.

Other objects and features of the invention will be apparent from the following detailed description with reference to the accompanying drawing wherein a preferred form of the valve is illustrated and wherein:

Fig. 1 is cross-sectional view of the valve structure; and

Fig. 2 is an exploded perspective view of certain parts.

Referring more particularly to the drawing, there is provided a valve casing 1 having a passage 2 therethrough which is opened and closed by rotation of a valve member 3 extending transversely of said passage and having a valve opening 4. The valve member 3 is generally cylindrical in form, and the casing 1 has aligned cylindrical openings 5 and 6 to accommodate said member. A plug 7 threadedly engages the lower opening 5 to close the same and to help support the rotatable valve member as hereinafter described.

As shown in Fig. 2, the valve member 3 has slots 8 and 9 which divide said member into two halves. The slots 8 and 9 do not extend completely across the valve member, so that the two halves are connected at the top and bottom by portions 10 and 11. By this construction, the valve member is slightly expansible by a wedging force tending to spread the two halves apart, the connecting portions 10 and 11 permitting such expansion.

At its upper end, the valve member has a key slot 12, and said member also has tapered recesses 13 and 14 at its opposite ends. A stem 15 has a flange 16 at its lower end disposed within opening 6 of the valve casing, and below said flange there is a key 17 which fits in the key slot 12. Thus the stem is operatively connected to the valve member 3 to rotate the same between valve-closing and valve opening positions.

Plug 7 and key 17 are provided with tapered recesses 18 and 19 which cooperate with the tapered recesses at the ends of the valve member 3 to accommodate spherical elements 20 and 21. The latter act as wedge elements to expand the valve member whenever desired, as hereinafter described. These elements also minimize friction and the lower element 21 acts as a seating bearing on plug 7 to support the rotatable valve member. Further, the spherical elements and the associated pocket-forming recesses insure alignment of the recessed parts and permit greater tolerances in the manufacture of the parts.

As shown in Fig. 1, a gland element 22 is threaded into the upper part of opening 6, and an associated gland element 23 is threaded into the upper part of element 22, the two elements forming the complete gland to accommodate suitable packing material 24, which may be in the form of a rubber ring. The gland also supports stem 15 for rotational and axial movement. A cap or shell 25 is threadedly attached to element 22 and is adjustable longitudinally by means of a nut portion 26. Within the upper part of the cap 25 is a bearing 27 and a plate 28, the latter engaging a shoulder 29 on the stem 15.

Normally the cap 25 is stationary and the valve operates solely by rotation of the valve member 3 through rotation of stem 15 as by handle 30. The stem is held axially against upward movement by the engagement of plate 28 with shoulder 29. The bearing 27 effectively eliminates any frictional drag on the stem during rotation of the latter, plate 28 and the lower bearing plate being permitted to rotate with the stem.

In the event that the valve member 3 and/or the casing 1 wear sufficiently to cause leakage of the valve, the cap 25 is adjusted to move it slightly downward. This causes slight downward axial movement of the stem 15, through the agency of bearing 27 and plate 28, the bearing permitting free rotation of the cap 25 relative to the stem. The downward movement of the stem causes forces to be exerted on the spherical elements 20 and 21 so as to spread slightly the two halves of valve member 3. This restores a snug fit between the surface of said member and the adjacent inner walls of casing 2. Thus the expansible valve member 3 may be expanded at will to compensate for wear and to prevent leakage. It will be apparent that the adjustment may be made with the valve closed, the cessation of leakage indicating sufficient adjustment.

From the foregoing description, it will be seen that the invention provides a simple rotary valve embodying means adjustable at will to maintain a snug fit between the rotating valve member and the casing. Thus the inherent objection of this type of valve has been overcome.

While no limitation is intended with respect to the materials of which the parts are composed, suitable metals will generally be employed according to common practices in the art. Of course, the rotatable valve member, when constructed as shown, must be composed of material capable of use as disclosed without fracture. However, it should be understood that the invention contemplates any suitable expansible construction of the valve member.

It will be apparent also that the invention is not limited as regards other structural details.

It is to be understood, therefore, that the invention contemplates such changes as may occur to those skilled in the art while retaining the structure essential to the purpose of the invention.

I claim:

1. A valve comprising a valve casing having a passage therethrough and also having a pair of aligned openings in transverse relation to said passage substantially midway thereof, a generally cylindrical expansible valve member supported in said openings transversely of said passage for rotary movement between valve-closing and valve-opening positions, said valve member having a passage therethrough alignable with the first-mentioned passage and also having slots dividing said member into two semi-cylindrical halves, said valve member also having a pair of axially-spaced recesses located on the longitudinal axis of said member and facing outwardly of said member, a plug threadedly engaging one of said casing openings and closing the same, said plug having a recess on its inner surface in confronting relation to one of the recesses of said valve member, the confronting recesses cooperatively forming a pocket, a spherical element disposed in said pocket and engaging the walls thereof, a rotatable stem extending into the other casing opening and having a recess at its inner end in confronting relation to the other recess of said valve member, the last-mentioned confronting recesses cooperatively forming a second pocket, a second spherical element disposed in the latter pocket and engaging the walls thereof, said recesses and spherical elements insuring alignment of the recessed parts and also serving to minimize friction as the valve member is rotated, interfitting means on said stem and said valve member whereby the valve member is rotated by rotation of the stem, and manually-operable means for effecting axial movement of said stem so as to expand said valve member through the medium of said spherical elements and the cooperating recesses of the valve member.

2. A valve comprising a casing structure having a passage therethrough, a generally cylindrical expansible valve member supported within said casing structure transversely of said passage for rotary movement between valve-closing and valve-opening positions, said valve member having a passage therethrough alignable with the first-mentioned passage and also having slots dividing said member into two semi-cylindrical halves, said valve member also having a pair of axially-spaced recesses located on the longitudinal axis of said member and facing outwardly of said member, said casing structure having an internal recess in confronting relation to one of the recesses of said valve member, the confronting recesses cooperatively forming a pocket, a spherical element disposed in said pocket and engaging the walls thereof, a second spherical element disposed in the other recess of said valve member, means for effecting expansion of said valve member, said means including an element having a recess in confronting relation to the said other recess of said valve member and forming with the latter recess a second pocket in which said second spherical element is disposed, said recesses and spherical elements serving to insure alignment of the recessed parts, to minimize friction when the valve member is rotated, and to effect expansion of the valve member, and means for rotating said valve member.

3. A valve comprising a casing structure having provision for fluid flow therethrough, a rotatable valve member arranged within said casing to control the fluid flow, said valve member having a passage therethrough and also having slots dividing said member into two expansible halves, said valve member also having a pair of axially-spaced recesses located on the axis of rotation of said member and facing outwardly of said member, said casing structure having an internal recess in confronting relation to one of the recesses of said valve member, the confronting recesses cooperatively forming a pocket, a spherical element disposed in and retained by said pocket, a rotatable stem extending into said casing structure and having a recess at its inner end in confronting relation to the other recess of said valve member, the last-mentioned confronting recesses cooperatively forming a second pocket, a second spherical element disposed in and retained by the latter pocket, said recesses and spherical elements insuring alignment of the recessed parts and also serving to minimize friction as the valve member is rotated, interfitting means on said stem and said valve member whereby the valve member is rotated by rotation of the stem, and means for moving said stem axially to effect expansion of said valve member through the medium of said spherical elements and the cooperating recesses of the valve member.

4. A valve comprising a casing structure having provision for fluid flow therethrough, a rotatable expansible valve member arranged within said casing to control the fluid flow, said valve member having a passage therethrough and also having slots dividing said member into two expansible halves, said valve member also having a pair of axially-spaced recesses located on the axis of rotation of said member and facing outwardly of said member, said casing structure having an internal recess in confronting relation to one of the recesses of said valve member, the confronting recesses cooperatively forming a pocket, a spherical element disposed in and retained by said pocket, a second spherical element disposed in the other recess of said valve member, means for effecting expansion of said valve member, said means including an element having a recess in confronting relation to the said other recess of said valve member and forming with the latter recess a second pocket to retain said second spherical element, said recesses and spherical elements serving to insure alignment of the recessed parts, to minimize friction when the valve member is rotated, and to effect expansion of the valve member, and means for rotating said valve member.

5. In a valve, a rotatable and expansible valve member having a passage therethrough and also having slots dividing said member into two expansible halves, said valve member also having a pair of axially-spaced recesses located on the axis of rotation of said member and facing away from each other, a pair of spherical elements disposed respectively in said recesses, a pair of valve parts having recesses in confronting relation respectively to the recesses of said valve member and cooperating with the latter recesses to form pockets to retain said spherical elements, one of said parts being movable to effect expansion of said valve member through the medium of said spherical elements and the associated recesses, the spherical elements and recesses also serving to insure alignment and to minimize friction, and means for rotating said valve member.

CHARLES W. CONRAD.

References Cited in the file of this patent

UNITED STATES PATENTS

| Number | Name | Date |
|---|---|---|
| 785,854 | Cadman | Mar. 28, 1905 |
| 1,932,322 | Nordstrom | Oct. 24, 1933 |
| 1,949,190 | Smolensky | Feb. 27, 1934 |
| 2,027,108 | Kuehling | Jan. 7, 1936 |
| 2,103,536 | Inge | Dec. 28, 1937 |

FOREIGN PATENTS

| Number | Country | Date |
|---|---|---|
| 595,700 | Great Britain | Dec. 12, 1947 |